United States Patent
Wang et al.

(10) Patent No.: US 9,729,873 B2
(45) Date of Patent: Aug. 8, 2017

(54) VIDEO CODING USING PARALLEL MOTION ESTIMATION

(71) Applicant: QUALCOMM Incorporated, San Diego, CA (US)

(72) Inventors: Xianglin Wang, San Diego, CA (US); Vadim Seregin, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 13/748,055

(22) Filed: Jan. 23, 2013

(65) Prior Publication Data

US 2013/0188720 A1 Jul. 25, 2013

Related U.S. Application Data

(60) Provisional application No. 61/590,311, filed on Jan. 24, 2012.

(51) Int. Cl.
*H04N 7/26* (2006.01)
*H04N 19/51* (2014.01)
(Continued)

(52) U.S. Cl.
CPC ..... *H04N 19/00684* (2013.01); *H04N 19/109* (2014.11); *H04N 19/147* (2014.11); *H04N 19/176* (2014.11); *H04N 19/194* (2014.11); *H04N 19/436* (2014.11); *H04N 19/52* (2014.11); *H04N 19/61* (2014.11)

(58) Field of Classification Search
None
See application file for complete search history.

(56) References Cited

U.S. PATENT DOCUMENTS

| 8,379,718 B2 * | 2/2013 | Wang | H04N 19/50 375/240.12 |
| 2012/0134416 A1 * | 5/2012 | Lin | H04N 19/52 375/240.16 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Jeremaiah C Hallenbeck-Huber
*Assistant Examiner* — Stefan Gadomski

(57) ABSTRACT

An example video encoder is configured to receive an indication of merge mode coding of a block within a parallel motion estimation region (PMER), generate a merge mode candidate list comprising one or more spatial neighbor motion vector (MV) candidates and one or more temporal motion vector prediction (TMVP) candidates, wherein motion information of at least one of the spatial neighbor MV candidates is known to be unavailable during coding of the block at an encoder, determine an index value identifying, within the merge mode candidate list, one of the TMVP candidates or the spatial neighbor MV candidates for which motion information is available during coding of the particular block, and merge mode code the block using the identified MV candidate.

10 Claims, 8 Drawing Sheets

(51) Int. Cl.

| | |
|---|---|
| *H04N 19/52* | (2014.01) |
| *H04N 19/176* | (2014.01) |
| *H04N 19/147* | (2014.01) |
| *H04N 19/61* | (2014.01) |
| *H04N 19/109* | (2014.01) |
| *H04N 19/194* | (2014.01) |
| *H04N 19/436* | (2014.01) |

(56) References Cited

U.S. PATENT DOCUMENTS

| | | | |
|---|---|---|---|
| 2012/0195368 A1 | 8/2012 | Chien et al. | |
| 2012/0230408 A1* | 9/2012 | Zhou | H04N 19/105 375/240.15 |
| 2012/0236942 A1 | 9/2012 | Lin et al. | |
| 2012/0257678 A1 | 10/2012 | Zhou et al. | |
| 2012/0269270 A1 | 10/2012 | Chen et al. | |
| 2012/0320969 A1 | 12/2012 | Zheng et al. | |
| 2013/0156335 A1* | 6/2013 | Lim | H04N 19/52 382/238 |
| 2013/0287116 A1* | 10/2013 | Helle | H04N 19/00072 375/240.24 |
| 2014/0286395 A1* | 9/2014 | Lee | H04N 19/137 375/240.02 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 215 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 10th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

International Search Report and Written Opinion from International Application No. PCT/US2013/022979, dated Oct. 8, 2013, 13 pp.

International Preliminary Report on Patentability from International Application No. PCT/US2013/022979, dated Jul. 29, 2014, 8 pp.

Zhou, et al., "AHG10: Configurable and CU-group level parallel merge/skip" JCT-VC Meeting, Document JCTVC-H0082, Jan. 2-10, 2012, 13 pp.

McCann, et al., "HM4: HEVC Test Mdoel 4 Encoder Description," JCT-VC Meeting, Document JCTVC-F82, Jul. 14-22, 2011, 36 pp.

Zhou, et al., "Parallelized merge/skip mode for HEVC," JCT-VC Meeting, Document JCTVC-F069, Jul. 14-22, 2011, 13 pp.

Jeon, et al., "Non-CE9: Improvement on parallelized merge/skip mode," JCT-VC Meeting, JCTVC-G164, Nov. 21-30, 2011, 2 pp.

Jeon, et al., "Non-CE9: Parallel Merge Candidate Derivation for Inter_NxN partition type," JCT-VC Meeting, Document JCTV-H0091, Feb. 2-10, 2012, 2 pp.

Ohm, et al., "Comparison of the Coding Efficiency of Video Coding Standards—Including High Efficiency Video Coding (HEVC)," IEE Transaction on Circuits and Systems for Video Technology, Jan. 2012, 15 pp.

Laroche, et al., "RD Optimized Coding for Motion Vector Predictor Selection," IEEE Transactions on Circuits and Systems for Video Technology, vol. 17, No. 12, Dec. 2008, 11 pp.

* cited by examiner

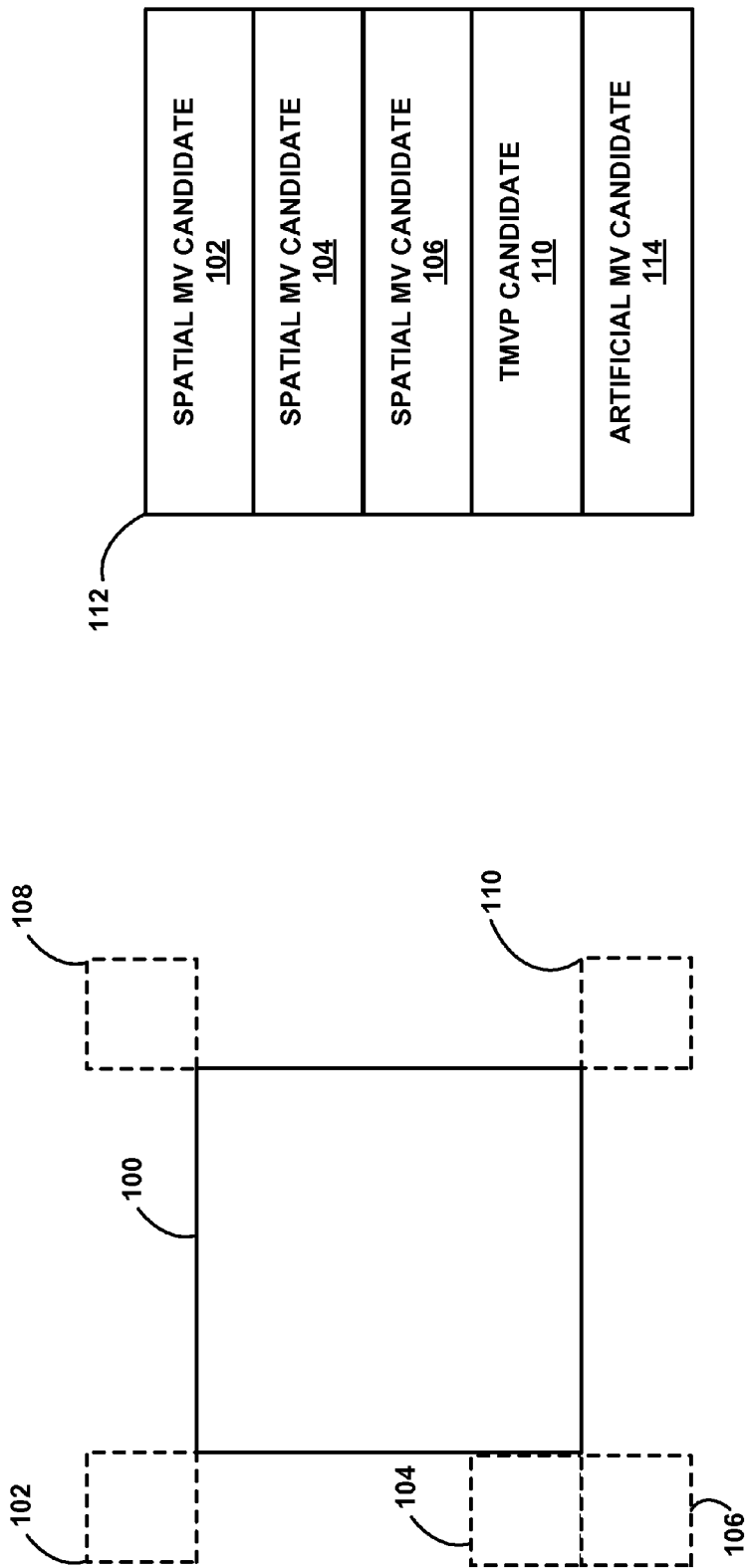

VIDEO CODING USING PARALLEL MOTION ESTIMATION

This application claims the benefit of U.S. Provisional Application Ser. No. 61/590,311, filed Jan. 24, 2012, the entire contents of which are hereby incorporated by reference.

TECHNICAL FIELD

This disclosure relates to video coding and, more particularly, video coding using parallel motion estimation.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. Extensions of standards include, for example, Scalable Video Coding (SVC) and Multiview Video Coding (MVC) extensions of H.264/AVC. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for implementing merge mode motion prediction coding in conjunction with parallel motion estimation (PME) in a video coding process. A video encoder may be configured to encode a parallel motion estimation region (PMER) of a picture or slice using merge mode motion prediction. Motion information for some merge mode motion vector (MV) candidates may not be available due to parallel processing performed for PME. In some examples, to encode a block in the PMER using merge mode motion prediction, the video encoder may generate a tentative list of merge mode motion vector (MV) candidates. Based on criteria discerned using the tentative merge mode MV candidate list, the video encoder may select a particular encoding mode with which to encode a block of the PMER, such as merge mode or another inter-prediction mode available to the encoder.

In one implementation, if the video encoder selects merge mode, the video encoder may, upon completion of mode determination for the PMER using PME, adjust the tentative merge mode MV candidate list to obtain a true merge mode MV candidate list, including MV candidates that were not previously available during PME. Additionally, the video encoder may select a particular MV candidate from the true merge mode MV candidate list, and signal the index of the selected MV within the true merge mode MV candidate list, such that a video decoder may decode the block of the PMER using the index for the selected MV. In examples, the selected MV candidate is the same candidate as determined based on the tentative merge mode MV candidate list. In these cases, the selected MV candidate is included in both the tentative and true merge mode MV candidate lists, and may be positioned according to the same or different index values in the respective MV candidate lists.

In another implementation, if the video encoder elects to encode the PMER using merge mode, the video encoder may signal syntax elements indicating the bounds of the PMER, and of encoding of particular blocks using merge mode motion estimation. In this example, a corresponding video decoder may be configured to implement one or more techniques of this disclosure to receive the signaled syntax elements as part of an encoded bitstream, and construct a merge mode MV candidate list based on the syntax elements signaled by the video encoder. For purposes of this disclosure, a merge mode MV candidate list constructed by a video decoder in this manner based on syntax elements signaled by a video encoder to indicate that a block positioned within a PMER was encoded using merge mode motion estimation may be referred to as a "modified" merge mode MV candidate list since it is constructed differently from the regular candidate list when PMER is not considered. In turn, the video decoder may use the modified merge mode MV candidate list, with the MV positioned according to an index value signaled from a corresponding encoder, to decode the block of the PMER.

In yet another implementation of the techniques described herein, a video encoder may use merge mode to code a block that is positioned within a PMER such that the block does not have any spatial MV candidates associated with spatial neighbor blocks positioned outside the PMER. In other words, no boundary of the block may overlap with any portion of the perimeter of the PMER. In this implementation, the video encoder may signal an indication that a block of the PMER was encoded using merge mode. In this implementation, if PME coding of such a block in merge mode is signaled, a corresponding video decoder may implement one or more of the techniques to select a temporal motion vector prediction (TMVP) candidate associated with the block. In this implementation, the video decoder may directly select the TMVP candidate based on availability from a different picture, rather than construct a merge mode MV candidate list for the block.

In one example, a method includes generating, for a coding unit (CU) positioned within a parallel motion estimation region (PMER) of an image, a first merge mode candidate list comprising one or more spatial neighbor motion vector prediction (MV) candidates and one or more temporal MV candidates, where motion information of at least one of the spatial neighbor MV candidates is unavailable during coding of the CU, and selecting, from the first merge mode candidate list, one of the temporal MV candidates or the spatial neighbor MV candidates for which motion information is available during coding of the CU, where the selected MV candidate has a first index value within the first merge mode candidate list. The method further includes generating, for the CU, a second merge mode candidate list based on the first merge mode candidate list, where the selected MV candidate has a second index value within the second merge mode candidate list, and signaling, in an encoded video bitstream, the second index value to identify the selected MV candidate for merge mode coding of the CU.

In another example, a device for coding video data includes a video encoder configured to generate, for a coding unit (CU) positioned within a parallel motion estimation region (PMER) of an image, a first merge mode candidate list comprising one or more spatial neighbor motion vector prediction (MV) candidates and one or more temporal MV candidates, where motion information of at least one of the spatial neighbor MV candidates is unavailable during coding of the CU, and select, from the first merge mode candidate list, one of the temporal MV candidates or the spatial neighbor MV candidates for which motion information is available during coding of the CU, where the selected MV candidate has a first index value within the first merge mode candidate list. The video encoder is further configured to generate, for the CU, a second merge mode candidate list based on the first merge mode candidate list, where the selected MV candidate has a second index value within the second merge mode candidate list, and signal, in an encoded video bitstream, the second index value to identify the selected MV candidate for merge mode coding of the CU.

In another example, a device for encoding video data includes means for generating, for a coding unit (CU) positioned within a parallel motion estimation region (PMER) of an image, a first merge mode candidate list comprising one or more spatial neighbor motion vector prediction (MV) candidates and one or more temporal MV candidates, where motion information of at least one of the spatial neighbor MV candidates is unavailable during coding of the CU, and means for selecting, from the first merge mode candidate list, one of the temporal MV candidates or the spatial neighbor MV candidates for which motion information is available during coding of the CU, where the selected MV candidate has a first index value within the first merge mode candidate list. The device further includes means for generating, for the CU, a second merge mode candidate list based on the first merge mode candidate list, where the selected MV candidate has a second index value within the second merge mode candidate list, and means for signaling, in an encoded video bitstream, the second index value to identify the selected MV candidate for merge mode coding of the CU.

In another example, a computer-readable storage medium has stored thereon instructions that, when executed, cause a programmable processor of a computing device to generate, for a coding unit (CU) positioned within a parallel motion estimation region (PMER) of an image, a first merge mode candidate list comprising one or more spatial neighbor motion vector prediction (MV) candidates and one or more temporal MV candidates, where motion information of at least one of the spatial neighbor MV candidates is unavailable during coding of the CU, and select, from the first merge mode candidate list, one of the temporal MV candidates or the spatial neighbor MV candidates for which motion information is available during coding of the CU, where the selected MV candidate has a first index value within the first merge mode candidate list. The instructions further cause the programmable processor of the computing device to generate, for the CU, a second merge mode candidate list based on the first merge mode candidate list, where the selected MV candidate has a second index value within the second merge mode candidate list, and signal, in an encoded video bitstream, the second index value to identify the selected MV candidate for merge mode coding of the CU.

In another example, a method includes generating, for a coding unit (CU) within a parallel motion estimation region (PMER) of an image, a merge mode candidate list comprising one or more spatial neighbor motion vector prediction (MV) candidates and one or more temporal MV candidates, where motion information of at least one of the spatial neighbor MV candidates is unavailable during coding of the CU, selecting, from the merge mode candidate list, one of the temporal MV candidates or the spatial neighbor MV candidates for which motion information is available during coding of the particular CU, where the selected MV candidate has an index value within the merge mode candidate list, and signaling, in an encoded video bitstream, the index value to identify the selected MV candidate for merge mode coding of the particular CU.

In another example, a device for coding video data includes a video encoder configured to generate, for a coding unit (CU) within a parallel motion estimation region (PMER) of an image, a merge mode candidate list comprising one or more spatial neighbor motion vector prediction (MV) candidates and one or more temporal MV candidates, where motion information of at least one of the spatial neighbor MV candidates is unavailable during coding of the CU, select, from the merge mode candidate list, one of the temporal MV candidates or the spatial neighbor MV candidates for which motion information is available during coding of the particular CU, where the selected MV candidate has an index value within the merge mode candidate list, and signal, in an encoded video bitstream, the index value to identify the selected MV candidate for merge mode coding of the particular CU.

In another example, a device for encoding video data includes means for generating, for a coding unit (CU) within a parallel motion estimation region (PMER) of an image, a merge mode candidate list comprising one or more spatial neighbor motion vector prediction (MV) candidates and one or more temporal MV candidates, where motion information of at least one of the spatial neighbor MV candidates is unavailable during coding of the CU, means for selecting, from the merge mode candidate list, one of the temporal MV candidates or the spatial neighbor MV candidates for which motion information is available during coding of the particular CU, where the selected MV candidate has an index value within the merge mode candidate list, and means for signaling, in an encoded video bitstream, the index value to identify the selected MV candidate for merge mode coding of the particular CU.

In another example, a computer-readable storage medium has stored thereon instructions that, when executed, cause a programmable processor of a computing device to generate, for a coding unit (CU) within a parallel motion estimation region (PMER) of an image, a merge mode candidate list comprising one or more spatial neighbor motion vector prediction (MV) candidates and one or more temporal MV candidates, where motion information of at least one of the spatial neighbor MV candidates is unavailable during coding of the CU, select, from the merge mode candidate list, one of the temporal MV candidates or the spatial neighbor MV candidates for which motion information is available during coding of the particular CU, where the selected MV candidate has an index value within the merge mode candidate list, and signal, in an encoded video bitstream, the index value to identify the selected MV candidate for merge mode coding of the particular CU.

In another example, a method for decoding video data includes receiving an indication of merge mode coding of a block within a parallel motion estimation region (PMER), and generating a merge mode candidate list comprising one or more spatial neighbor motion vector (MV) candidates and one or more temporal motion vector prediction (TMVP) candidates, wherein motion information of at least one of the spatial neighbor MV candidates is known to be unavailable during coding of the block at an encoder. The method further includes determining an index value identifying, within the merge mode candidate list, one of the TMVP candidates or the spatial neighbor MV candidates for which motion information is available during coding of the particular block, and merge mode coding the block using the identified MV candidate.

In another example, a device for coding video data includes a video decoder configured to receive an indication of merge mode coding of a block within a parallel motion estimation region (PMER), and generate a merge mode candidate list comprising one or more spatial neighbor motion vector (MV) candidates and one or more temporal motion vector prediction (TMVP) candidates, wherein motion information of at least one of the spatial neighbor MV candidates is known to be unavailable during coding of the block at an encoder. The video decoder is further configured to determine an index value identifying, within the merge mode candidate list, one of the TMVP candidates or the spatial neighbor MV candidates for which motion information is available during coding of the particular block, and merge mode code the block using the identified MV candidate.

In another example, a device for decoding video data includes means for receiving an indication of merge mode coding of a block within a parallel motion estimation region (PMER), means for generating a merge mode candidate list comprising one or more spatial neighbor motion vector (MV) candidates and one or more temporal motion vector prediction (TMVP) candidates, wherein motion information of at least one of the spatial neighbor MV candidates is known to be unavailable during coding of the block at an encoder, means for determining an index value identifying, within the merge mode candidate list, one of the TMVP candidates or the spatial neighbor MV candidates for which motion information is available during coding of the particular block, and means for merge mode coding the block using the identified MV candidate.

In another example, a computer-readable storage medium has stored thereon instructions that, when executed, cause a programmable processor of a computing device to receive an indication of merge mode coding of a block within a parallel motion estimation region (PMER), generate a merge mode candidate list comprising one or more spatial neighbor motion vector (MV) candidates and one or more temporal motion vector prediction (TMVP) candidates, wherein motion information of at least one of the spatial neighbor MV candidates is known to be unavailable during coding of the block at an encoder, determine an index value identifying, within the merge mode candidate list, one of the TMVP candidates or the spatial neighbor MV candidates for which motion information is available during coding of the particular block, and merge mode code the block using the identified MV candidate.

In another example, a method of decoding video data includes receiving an indication of merge mode coding of a block positioned within a parallel motion estimation region (PMER) such that the block does not have any spatial neighbor motion vector (MV) candidates associated with neighboring blocks positioned outside the PMER, identifying a temporal motion vector prediction (TMVP) candidate associated with the block, and merge mode coding the block using the identified TMVP candidate based on the indication of merge mode coding of a block within a PMER.

In another example, a device for coding video data includes a video decoder configured to receive an indication of merge mode coding of a block positioned within a parallel motion estimation region (PMER) such that the block does not have any spatial neighbor motion vector (MV) candidates associated with neighboring blocks positioned outside the PMER, identify a temporal motion vector prediction (TMVP) candidate associated with the block, and merge mode code the block using the identified TMVP candidate based on the indication of merge mode coding of a block within a PMER.

In another example, a device for decoding video data includes means for receiving an indication of merge mode coding of a block positioned within a parallel motion estimation region (PMER) such that the block does not have any spatial neighbor motion vector (MV) candidates associated with neighboring blocks positioned outside the PMER, means for identifying a temporal motion vector prediction (TMVP) candidate associated with the block, and means for merge mode coding the block using the identified TMVP candidate based on the indication of merge mode coding of a block within a PMER.

In another example, a computer-readable storage medium has stored thereon instructions that, when executed, cause a programmable processor of a computing device to receive an indication of merge mode coding of a block positioned within a parallel motion estimation region (PMER) such that the block does not have any spatial neighbor motion vector (MV) candidates associated with neighboring blocks positioned outside the PMER, identify a temporal motion vector prediction (TMVP) candidate associated with the block, and merge mode code the block using the identified TMVP candidate based on the indication of merge mode coding of a block within a PMER.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C are conceptual diagrams illustrating merge mode candidate list construction, in accordance with one or more aspects of this disclosure.

DETAILED DESCRIPTION

Figure 1:
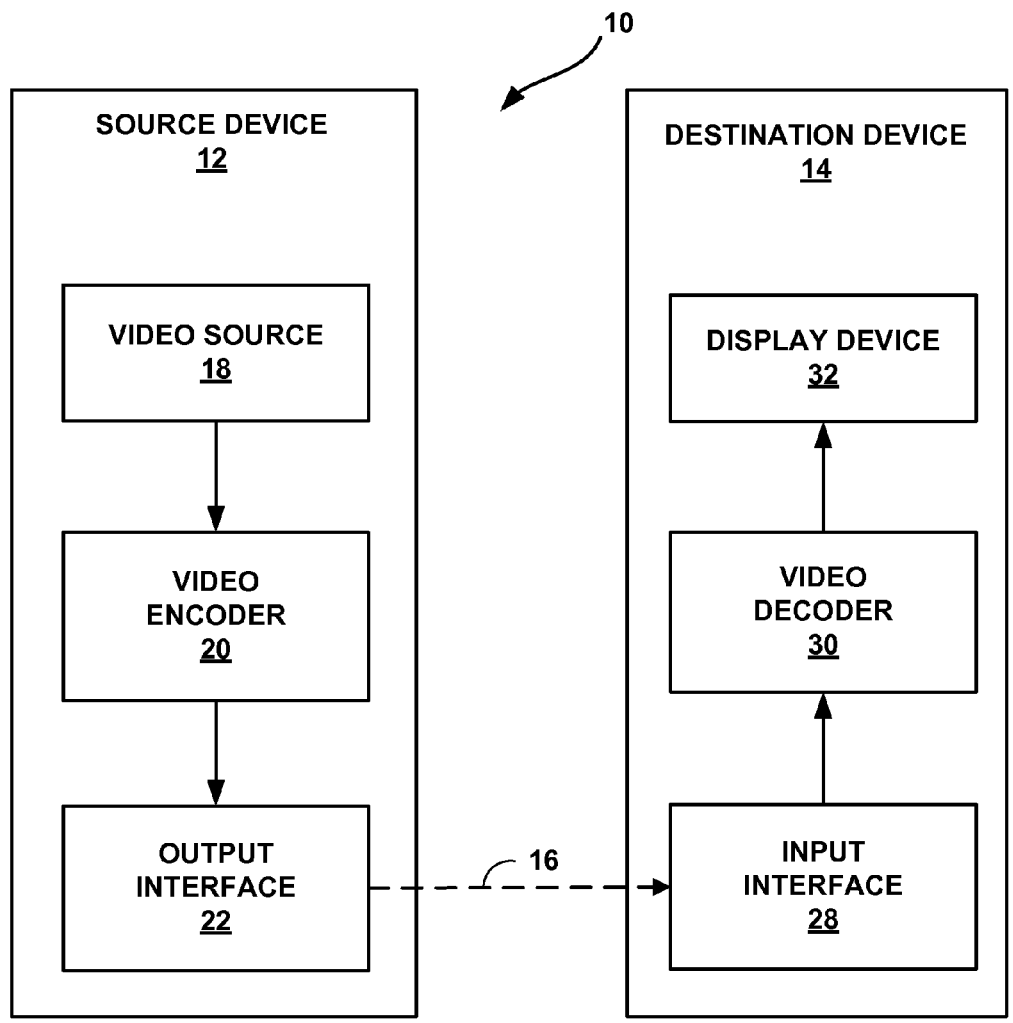
FIG. 1 is a block diagram illustrating an example video encoding and decoding system that may utilize techniques for coding video data using parallel motion estimation.

This disclosure is generally directed to techniques for performing merge mode motion prediction while coding a picture, or portions thereof, using parallel motion estimation (PME). A video encoder implementing PME may identify a region of a picture or slice to code using PME. This region may be referred to as a parallel motion estimation region (PMER). In turn, the video encoder may encode the coding units (CUs) of the PMER using PME. As used herein, the terms "code" and "encode" may refer largely to the process of motion estimation. The encoder may use PME for all CUs of a picture or slice, such that the PMER covers the entire picture or slice, or the encoder may use PME for only some CU's within a PMER forming a sub-portion of the picture of slice. If PME is not used for certain CUs, the encoder may code these CUs sequentially (e.g., in raster scan order).

When coding the PMER using PME, the video encoder may encode CUs of the PMER in parallel, i.e., simultaneously. In other words, if the video encoder encodes a particular CU of the PMER relying on information from a neighboring CU within the PMER, such as in the case of merge mode coding, the video encoder may not have the necessary motion information from the neighboring CU available immediately. More specifically, because the video encoder encodes the entire PMER in parallel, the motion information for a neighboring CU from which the video encoder requires information may not be encoded in advance of the current CU being coded.

When implementing PME in conjunction with merge mode motion prediction, the video encoder may require one or more CUs of the PMER to be encoded in order to code another CU of the PMER. More specifically, for a current CU, the video encoder may identify one or more CUs within the PMER as spatial neighbor MV candidate blocks for merge mode. As a result, the video encoder may require the identified spatial candidate blocks to be coded, so that the video encoder is able to extract motion vectors and other motion information, such as prediction direction (to identify List 0 or List 1) and reference picture index (to identify the reference picture within the pertinent list), from the spatial candidate block(s) in order to populate the merge list for the current CU. If one or more of the spatial candidate blocks are not yet coded (e.g., if the spatial candidate blocks are within the PMER and are being coded in parallel with the current CU), the video encoder would need to wait until those spatial candidate blocks are coded before coding the current CU. In this scenario, waiting for coding of spatial candidate blocks may undermine one or more benefits offered by PME.

To maintain the functioning of PME while using merge mode motion prediction, a video encoder may implement one or more techniques of this disclosure. As one example, a video encoder may determine a tentative merge list for a CU that is positioned within the PMER. For instance, the video encoder may populate the tentative merge list for the CU using up to four merge motion vector (MV) candidates associated with spatial neighbor candidate blocks that are positioned outside the PMER (e.g., indexed from 0-3 within the tentative merge list). If a spatial candidate block is not positioned outside the PMER, the corresponding motion vector may be unavailable when checking merge mode for the current CU. In this case, the corresponding merge index is reserved but no motion vector corresponding to the reserved index needs to be checked under merge mode. Additionally, the video encoder may also populate the next candidate of the merge list using the temporal motion vector prediction (TMVP), as the TMVP is associated with a block of a different frame, and is not subject to the PMER restriction of certain spatial MV candidates.

In the implementation described above, the video encoder may attach an "estimated index" to each merge MV candidate of the tentative merge list. The estimated index indicates the position of the candidate within the tentative merge list. In other words, in an accurate, or "true" merge list, the merge MV candidates may have different index values, e.g., due to pruning of MV candidates. In particular, some candidates may be pruned based on redundant motion information or other factors, thereby shortening the list. Index values of MV candidates in the true merge list may be referred to herein as a true merge index value or a true index value. During PMER, however, the actual motion information of the yet-to-be-coded candidates is unavailable. Accordingly, it is not possible to identify redundant candidates and obtain the true merge index value for each merge MV candidate. In addition, it is not possible to evaluate actual rate-distortion (RD) cost for such yet-to-be-coded candidates. To enable PME for merge mode, the video encoder may attach these estimated index values to the merge MV candidates, thereby coding the entire PMER in parallel without delays caused by spatial candidate blocks within the PMER. After completing a mode determination for the entire PMER using tentative merge lists wherever applicable, the video encoder may form true merge lists (e.g., by pruning the tentative merge lists and/or adding artificial MV candidates), and signal the true merge index values for those blocks for which merge mode coding was selected.

Additionally, the video encoder may estimate a rate-distortion (RD) cost associated with the tentative merge lists. The RD cost may indicate an amount of discrepancy (distortion) of a reconstructed block in comparison to the original block that was coded. The estimated RD cost may be based on values associated with the estimated indexes of the various MV candidates in the tentative merge lists. In particular, the value of the index used to represent a selected MV candidate contributes to the number of coding bits required, and hence the rate in the RD cost. In some examples, a video encoder may assign, to an MV candidate, an estimated index value that is the largest possible index value for that MV candidate, assuming there is no MV pruning for unknown MV candidates at the time of merge mode motion estimation. In such cases, the estimated RD cost for the MV candidate in the tentative MV candidate list may represent a "ceiling," i.e., maximum value of the true RD cost of the particular MV candidate in the corresponding true merge list. For instance, the true merge list may prune one or more MV candidates of the tentative merge list to form the true merge list once all of the spatial MV candidates are available, in order to remove redundant motion information from different candidates. Due to the pruning process, the selected MV candidate may "move up" in position from its position in the tentative merge list to its position in the true merge list, i.e., the selected MV candidate may be positioned according to a smaller index value in the true merge list as compared to a greater index value in the tentative merge list.

In this implementation, the video encoder may compare the estimated RD cost associated with merge mode to RD costs associated with encoding the CU using encoding modes other than merge mode, such as various inter-prediction modes available to the encoder. In a scenario where the estimated RD cost represents one of the lowest values of the various RD costs, the video encoder may encode the CU using merge mode. Since tentative merge lists may be derived in parallel for different CUs positioned inside the PMER, merge mode motion estimation for all CUs positioned within the PMER may be performed in parallel. More specifically, in this implementation, if merge mode is selected based on the tentative merge list, the video encoder may construct the true merge list after mode decision, determine the true merge index for the selected MV candidate, and signal the true merge index of the selected MV candidate in the true merge list.

Upon performing motion estimation in parallel for all relevant portions of the PMER, the video encoder may adjust the tentative merge list to generate the true merge list. More specifically, the video encoder may place, in the tentative merge list, those MV candidates that become available after PME, adjust the tentative merge list by pruning one or more MV candidates to remove motion information redundancy. In cases where the video encoder prunes one or more MV candidates, the video encoder may reassign lesser index values to MV candidates that were originally positioned after the pruned MV candidates. In turn, the video encoder may signal an index that indicates the position of the selected MV candidate in the true merge list, thereby enabling a video decoder to decode the CU using the selected MV candidate. More specifically, the video decoder may be configured to reconstruct the true merge list for the block, and use the index signaled by the video encoder to select the MV candidate with which to decode the block.

A potential advantage of this implementation is that no changes are required to the configuration or architecture of a video decoder that receives the coded image. This is because the video encoder may provide the index of the selected candidate in the true merge list as part of an encoded bitstream that complies with the current HEVC standard. Accordingly, a video decoder that conforms to the current HEVC standard may be configured to receive and decode the encoded bitstream, e.g., without any modifications. More specifically, this implementation may require no changes to existing video decoder infrastructure, configuration, or architecture, as the video decoder is configured to generate the true merge list. A true merge list that the video encoder generates according to this implementation may correspond to a merge list that the video encoder generates for the block when all of the MV candidates are available, i.e., all spatial neighbors are encoded, and the motion information for the spatial neighbors is available to the video encoder.

In another implementation of the techniques described herein, in cases where the video encoder uses merge mode to encode the PMER in accordance with PME, the video encoder may signal syntax elements that indicate the area encompassed by a PMER, and syntax elements indicating merge mode usage of particular blocks. Based on these syntax elements signaled by the video encoder, a video decoder may implement the techniques of this disclosure to reconstruct a modified merge list for a block that is within the PMER and decode the block using merge mode. More specifically, the video decoder may use a selected MV candidate included in the modified merge mode MV candidate list (e.g., positioned according to an index value) to perform motion compensation in decoding the block.

In this implementation, the corresponding video decoder may be configured to reconstruct the modified merge mode candidate list, in accordance with one or more aspects of this disclosure, rather than the merge mode candidate list that the video decoder would have reconstructed for the block in accordance with merge mode when PME is not considered. The video decoder may receive, as part of an encoded bitstream, one or more syntax elements indicating the area of the picture encompassed by the PMER. Additionally, the video decoder may receive one or more syntax elements indicating that the video encoder used merge mode in encoding particular blocks of the picture, such as a block positioned within the PMER. In scenarios where the video decoder determines, based on the received syntax elements, that a block positioned within a PMER was encoded using merge mode, the video decoder may implement techniques of this disclosure to reconstruct a modified merge mode MV candidate list for the block. In examples, such a modified merge mode MV candidate list may resemble a tentative merge mode MV candidate list that the video encoder may generate for the same block, in accordance with techniques of this disclosure. In other examples, such a modified merge mode MV candidate list may exclude those spatial merge mode MV candidates that are not available for a current block being considered during motion estimation process due to PME.

For instance, the video decoder may determine that certain spatial MV candidates for the block are available, based on motion information for certain spatial neighbor candidate blocks that have already been coded at the time the current block is being coded (e.g., spatial neighbor candidate blocks positioned outside the PMER). In this example, the video decoder may construct the modified merge mode MV candidate list by using one or more of the available spatial MV candidates and a TMVP candidate. To compensate for any unavailable MV candidates by populating the remainder of the modified merge mode MV candidate list using artificial MV candidates and/or so-called "zero MV" candidates that indicate an absence of motion information.

By constructing a modified merge list based on signaled syntax elements indicating merge mode being used for a block positioned within a PMER, the codec may more efficiently signal encoded video data and associated index values. More specifically, by using a modified merge list constructed in the manner described to determine motion information for the block, merge mode motion estimation may be performed in parallel for all the blocks of the PMER. Meanwhile, a best merge index indicating the best merge mode MV candidate may also be determined for each block based on the modified merge list. In several examples, the video decoder may implement techniques similar to those described with respect to the video encoder to construct the modified merge list and determine motion information for the block using the index value of an MV candidate included in the modified merge list.

In another implementation, a video encoder may implement techniques of this disclosure to signal an indication in the encoded video bitstream that a CU positioned within a PMER such that the CU has no spatial neighbor MV candidates associated with spatial neighbor CUs outside the PMER was encoded using merge mode. In this case, the video encoder may select the TMVP candidate associated with the CU for its merge mode coding, without constructing a merge list for the CU. In this implementation, the video decoder may receive, as part of the encoded bitstream, the indication that the CU was positioned within a PMER and was encoded using merge mode. In turn, the video decoder may select the TMVP candidate associated with the CU, thereby avoiding constructing a merge list for the encoded CU. In other words, if the video decoder detects a set of conditions with respect to the CU, e.g., that the CU was encoded using PME, and that the encoding was done in merge mode, the video decoder may use the TMVP candidate to decode and reconstruct the CU. This approach simplifies the merge mode selection by the encoder and decoder when PME is used.

FIG. 1 is a block diagram illustrating an example video encoding and decoding system 10 that may utilize techniques for coding video data using parallel motion estimation. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding blocks positioned within a parallel motion estimation region (PMER) using parallel motion estimation (PME) in accordance with merge mode motion estimation. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding blocks positioned within a PMER using PME in accordance with merge mode motion estimation may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable coding circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or coding tree units (CTUs) that include both luma and chroma samples. Syntax data within a bitstream may define a size for the CTU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector. In examples where video encoder 20 and/or video decoder 30 use merge mode motion estimation to code a PU, the respective video coder may prepare a list of motion vector (MV) candidates for the PU, based on motion information of various other blocks of the same or different video frame. For instance, video encoder 20 may select a particular MV candidate from the merge list, and encode the PU using motion information of the selected MV.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or CTU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may implement one or more techniques of this disclosure to more efficiently code an image, such as a frame of video, using parallel motion estimation (PME), while also using merge mode motion prediction. In examples, video encoder 20 may encode the image using the techniques such that video decoder 30 need not implement any configuration changes in order to decode the corresponding encoded bitstream. In other examples, video encoder 20 may encode the image in such a manner that video encoder 20 also signals (e.g., via computer-readable medium 16) an indication to video decoder 30 that the encoded bitstream was encoded according to techniques of this disclosure. In these examples, video decoder 30 may also implement one or more techniques of this disclosure to decode the encoded bitstream. In any of the scenarios described above, video encoder 20 and/or video decoder 30 may implement the techniques of this disclosure to enable video encoder 20 to encode an image using PME, while selecting an encoding mode, such as merge mode, without causing delays to the PME encoding process.

In some examples, video encoder 20 may encode the image using PME, while implementing techniques referred to herein as "encoder-only" techniques. More specifically, video encoder 20 may implement the encoder-only techniques such that video decoder 30 may decode the corresponding encoded bitstream without any configuration changes. Additionally, the encoded bitstream may comply with requirements specified by the current HEVC standard.

For instance, video encoder 20 may determine a tentative merge list for a CU that is positioned within the PMER. For instance, video encoder 20 may populate the tentative merge list for the CU using up to four merge motion vector (MV) candidates associated with spatial neighbor candidate blocks that are positioned outside the PMER (e.g., indexed from 0-3 within the tentative merge list). Additionally, video encoder 20 may populate the next candidate of the merge list using the temporal motion vector prediction (TMVP), as the TMVP is associated with a block of a different frame, and is not subject to the PMER restriction of certain spatial MV candidates.

In the encoder-only implementation described above, video encoder 20 may attach an "estimated index" to each merge MV candidate of the tentative merge list. In other words, in an accurate, or "true" merge list that video encoder 20 would generate in traditional merge mode motion prediction scenarios where PME for different CUs are not considered, the merge MV candidates may have different index values, e.g., due to pruning and addition of MV artificial candidates. In particular, in traditional merge mode motion prediction scenarios, video encoder 20 may prune some candidates based on redundant motion information or other factors, resulting in a different MV candidate list from the tentative merge list (e.g., with one or more MV candidates positioned according to different index values). During PME, however, the actual motion information of the yet-to-be-coded spatial neighbor MV candidates may be unavailable to video encoder 20. Accordingly, in such scenarios, video encoder 20 may not be able to identify redundant candidates. In addition, video encoder 20 may not be able to evaluate actual rate-distortion (RD) cost for such yet-to-be-coded candidates. To enable merge mode RD cost evaluation during PME, video encoder 20 may attach these estimated index values to the merge mode MV candidates, thereby coding the entire PMER in parallel without delays caused by spatial candidate blocks within the PMER. After a mode determination for the entire PMER, video encoder 20 may adjust all of the tentative merge lists within the PMER to form true merge lists (e.g., by pruning the tentative merge lists and/or adding artificial candidates), and determine a true merge index for a block positioned in the PMER if the mode for coding the block is determined to be merge mode in the mode determination process. For such a block, video encoder 20 may signal the true merge index (e.g., to video decoder 30).

Additionally, video encoder 20 may estimate the rate-distortion (RD) cost associated with transmitting the tentative merge lists to another device, such as signaling to video decoder 30 via computer readable medium 16. For instance, the estimated index of 4 for the TMVP may require 4 bits to code; as a result, the estimated RD cost of the tentative merge list takes into account an RD cost of 4 bits for the TMVP. When video encoder 20 generates the true merge list, such as through adjusting the tentative merge list, the RD cost may decrease. For instance, the actual index of the TMVP may decrease due to loss of one or more spatial MV candidates through video encoder 20 pruning the tentative merge list, e.g., to eliminate redundant candidates having the same motion information, such that the same candidate may have a smaller value index which requires less bits to code. In this example, the estimated RD cost represents a "ceiling," i.e., maximum, value of the true RD cost associated with the particular MV candidate. More specifically, the true RD cost associated with the MV candidate may be less than or equal to the estimated RD cost that video encoder 20 determined with respect to the tentative merge list. Video encoder 20 may use additional factors in determining the estimated RD cost associated with the estimated index, based on an amount of distortion introduced by using the particular MV candidate (indicated by the estimated index) to encode the CU.

When encoding a block positioned within the PMER using merge mode motion prediction, the TMVP candidate may often be available to video encoder 20, as the TMVP candidate is associated with a block of a different picture, and, by definition, is not determined from a block of the current picture, much less from a block within the PMER of the picture being encoded currently. Additionally, in some scenarios, one or more spatial MV candidates may be available to video encoder 20. More specifically, spatial MV candidates that are associated with blocks positioned outside the PMER may be available to video encoder 20. For instance, the block being coded currently may be positioned at one or more edges of the PMER. In this scenario, the block being coded may have neighboring blocks that are positioned outside the PMER.

Video encoder 20 may use the estimated RD cost to select a particular mode by which to encode the CU. More specifically, video encoder 20 may compare the estimated RD cost associated with selecting one of the MV candidates in merge mode to RD costs associated with encoding the CU using different encoding modes other than merge mode, such as various inter-prediction modes available to video encoder 20. In other words, with the RD cost estimation described herein, video encoder 20 may select merge mode and/or skip mode by evaluating these modes in comparison to the other non-merge inter modes, and may thereby choose a best mode. For selection of the merge mode, video encoder 20 also selects one of the MV candidates.

In an example where the estimated RD cost of encoding the block in a PMER using the selected MV candidate represents one of the lowest values of the various RD costs, video encoder 20 may encode the block using merge mode. Upon selecting a mode for the relevant portions of the PMER, all of the spatial neighbor candidate blocks associated with the CU in the PMER are available, and video encoder 20 may adjust the tentative merge list as described above to generate the true merge list associated with the CU.

In turn, the actual index of the selected MV may be determined using the true merge list. That is, whereas the selected MV candidate is identified by a particular index value in the tentative merge list, it may be identified by a different index value in the true merge list in the event the true merge list is different from the tentative merge list. In one example, the tentative merge list could include five candidates, assuming the availability of the TMVP and four spatial neighbor MV candidates without pruning Video encoder 20 may use this assumption of a non-pruned merge list to perform the RD cost estimate. However, with pruning, the true merge list could be different from the tentative merge list. Hence, if the true merge list is different from the tentative merge list, the index value of the selected MV candidate may be smaller, and shorter in bit length signaled. The index may change, for example, because the selected MV candidate moves up in the list position, e.g., from 5 to 3, as one example. The actual cost of the selected MV candidate from the tentative merge list may be less than the estimated cost, due to the possible reduction in bits necessary to code the index value, and certainly will not be more than the estimated cost. Video encoder 20 may signal the actual index, thereby enabling video decoder 30 to decode the CU using the selected MV, and without requiring video decoder 30 to deviate from the ordinary process for generating a merge mode candidate list.

Conversely, in an example where the estimated RD cost of a selected MV candidate in the tentative list is not one of the lowest values of the available RD costs, video encoder 20 may select an encoding mode, such as an inter-prediction mode, that is different from merge mode. In this example, even if the actual index of the selected MV introduces the lowest RD cost to the encoding process, video encoder 20 may decline to use merge mode, based on the estimated RD cost associated with the estimated index. Instead, in this scenario, video encoder 20 may code the PMER in accordance with PME using a different encoding mode.

A potential advantage of the encoder-only implementation described above is that no changes are required to the configuration or architecture of video decoder 30 in order to receive and decode the encoded bitstream signaled by video encoder 20. More specifically, the encoder-only implementation requires no changes to existing video decoder infrastructure, configuration, or architecture. Instead, video encoder 20 implements all of the merge mode-based PME enhancements described above, and signals the index (in case of merge mode selection) in a manner that is readily processed by a standard-compliant video decoder infrastructure, such as an HEVC-compliant decoder. Additionally, in the encoder-only implementation, video encoder 20 may encode the picture to generate an encoded bitstream that complies with one or more requirements specified in the current HEVC standard. In this manner, the encoder-only techniques of this disclosure may enhance a video encoder's use of merge mode encoding in accordance with PME without requiring any changes or updates to a corresponding video decoder.

In some examples, video encoder 20 may encode the image using PME, while implementing techniques referred to herein as "encoder-decoder" techniques. In these examples, video decoder 30 may also implement one or more techniques of this disclosure to decode the encoded bitstream signaled by video encoder 20. In the encoder-decoder examples described herein, video encoder 20 may signal an encoded bitstream based on the modified merge list and related RD costs to video decoder 30, and video decoder 30 may decode the encoded bitstream using data related to the modified merge list.

As described above with respect to the encoder-only implementation, video encoder 20 may use an estimated RD cost associated with an MV candidate in a tentative merge list of a block, such as a PU, to select a particular mode by which to encode the CU. More specifically, video encoder 20 may compare the estimated RD cost to RD costs associated with encoding the CU using different encoding modes other than merge mode, such as various inter-prediction modes available to video encoder 20. In an example where the estimated RD cost of an MV candidate, such as the TMVP or an available spatial neighbor MV candidate, in the tentative merge list represents the lowest value of the various RD costs, video encoder 20 may encode the block using merge mode.

In cases where video encoder 20 uses merge mode to code a block of the PMER in accordance with PME, video encoder 20 may signal one or more syntax elements associated with the block. More specifically, video encoder 20 may signal one or more syntax elements that indicate the boundaries of the PMER, thereby identifying blocks positioned within the PMER. Additionally, video encoder 20 may signal one or more syntax elements that indicate that particular blocks were encoded using merge mode motion prediction. Based on these syntax elements signaled by video encoder 20, video decoder 30 may be configured to construct a modified merge mode candidate list for a block using the encoded bitstream signaled by video encoder 20. More specifically, video decoder 30 may construct the modified merge mode candidate list for those blocks that video decoder 30 determines to be positioned within the PMER and having been coded using merge mode motion prediction. In turn, the selected MV candidate may be positioned according to a particular index value within the modified merge mode candidate list constructed by video decoder 30. The modified merge mode candidate list may differ from a merge mode candidate list that would ordinarily be produced according to merge mode when PME is not signaled to decoder.

Video decoder 30 may receive encoded video data representing the picture, or portions thereof. More specifically, video decoder 30 may receive the encoded CU, e.g., via computer-readable medium 16. In examples where video encoder 20 encoded the CU in merge mode in accordance with PME, video decoder 30 may implement techniques of this disclosure to construct the modified merge list, instead of reconstructing a merge list that would ordinarily be constructed when PME is not considered. For instance, video decoder 30 may construct the modified merge list using one or more spatial MV candidates that are available, such as MV candidates associated with spatial neighbor candidate blocks positioned outside the PMER, and a TMVP candidate associated with a block of a different picture. In instances where video decoder 30 determines that one or more spatial MV candidates are unavailable, such as MV candidates associated with other blocks positioned within the PMER, video decoder 30 may exclude the MV candidate from the modified merge list. Based on the spatial MV candidates and TMVP that are added in the modified merge list, video decoder 30 may generate artificial MV candidates and/or zero MV candidates to fill the list if needed.

Upon constructing the modified merge list associated with the encoded CU, video decoder 30 may use the modified merge list, with the MV candidate positioned according to the corresponding index signaled from video encoder 20, to decode the CU. In this manner, video decoder 30 may implement portions of the encoder-decoder techniques of this disclosure to enable corresponding video encoder 20 to maintain the functioning of PME while using merge mode. By constructing a modified merge list that includes a selected MV candidate positioned according to the corresponding index value, video decoder 30 may enable video encoder 20 to more efficiently signal encoded video data and associated index values. While video decoder 30 may not implement PME (as PME is an encoder-specific process), video decoder 30 may implement encoder-decoder techniques similar to those described with respect to video encoder 20 to construct a modified merge list, and decode the CU using the index value of the selected MV candidate in the modified merge list. More specifically, video decoder 30 may use the selected MV candidate, and use motion information indicated by the selected MV candidate, such as a reference index and/or a prediction direction, to decode the current block.

In another implementation of the encoder-decoder techniques described herein, video encoder 20 may signal an indication that a CU positioned within a PMER such that the CU does not have any spatial MV candidates associated with spatial neighbor CUs outside the PMER was encoded using merge mode. In other words, the boundaries of the CU may not overlap at all with the perimeter of the PMER. In this implementation, video decoder 30 may receive, as part of the encoded bitstream, the indication that the CU is positioned within a PMER and coded using merge mode. In turn, video decoder 30 may directly select the TMVP candidate associated with the CU, thereby avoiding constructing a merge list for the encoded CU. In other words, if video decoder 30 detects a set of conditions with respect to the CU, i.e., that video encoder 20 performed the encoding in merge mode, and that the CU is positioned within a PMER such that no spatial MV candidate for the CU is available to video encoder 20 at the time of encoding the CU, then video decoder 30 may directly use the TMVP candidate in merge mode decoding the CU. Hence, in this implementation, the TMVP is selected whenever the block to be coded resides in a PMER without sharing any overlapping boundary at all with the PMER, effectively bypassing merge mode list construction.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
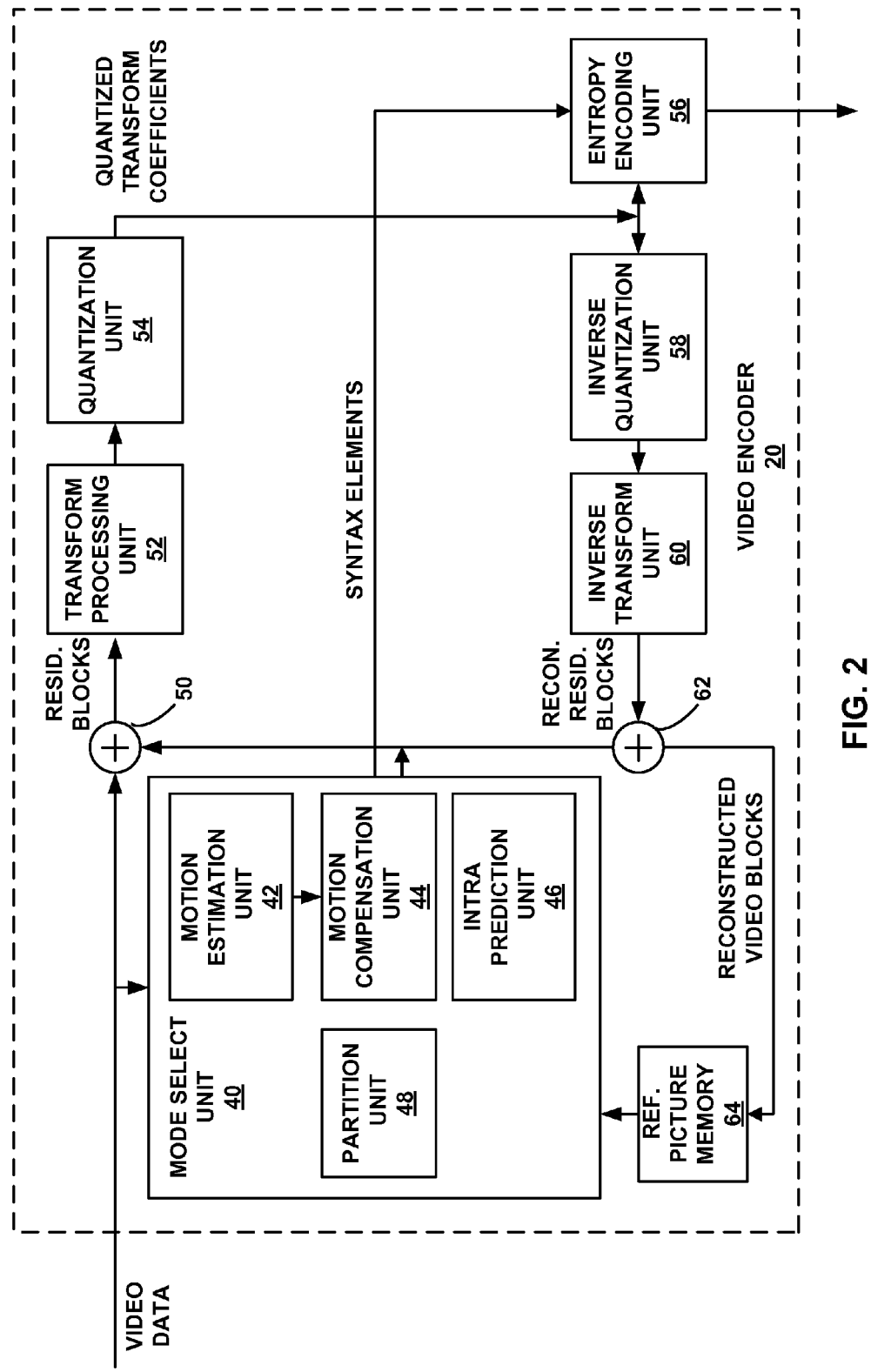
FIG. 2 is a block diagram illustrating an example of a video encoder that may implement techniques for encoding video data using parallel motion estimation.

FIG. 2 is a block diagram illustrating an example of video encoder 20 that may implement techniques for encoding video data using parallel motion estimation. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, inter-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44. In examples, motion estimation unit 42 may use PME to perform motion estimation for a PMER of a video frame. In accordance with PME, motion estimation unit 42 may perform motion estimation for all blocks (e.g., PUs) of the PMER in parallel. In some scenarios where mode select unit 40 selects merge mode for encoding of a block positioned within the PMER, motion estimation unit 42 motion estimation unit 42 may identify spatial neighbor candidate blocks positioned within the PMER. In such scenarios, motion estimation unit 42 may not have access to motion information for the spatial neighbor candidate blocks within the PMER, as these particular blocks may be encoded in parallel with the block to be coded currently.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy encoding, context may be based on neighboring blocks. Following the entropy coding by entropy encoding unit 56, the encoded bitstream may be transmitted to another device (e.g., video decoder 30) or archived for later transmission or retrieval.

In examples, one or both of mode select unit 40 and entropy encoding unit 56 may implement one or more of the encoder-only and encoder-decoder techniques described herein to code a parallel motion estimation region (PMER) of a video frame or picture using parallel motion estimation (PME), and select an encoding mode, such as merge mode, in which to perform the encoding. More specifically, mode select unit 40 may generate an estimated rate distortion (RD cost) associated with entropy encoding unit 56 encoding a video frame using PME in merge mode. Based on the estimated RD cost associated with entropy encoding unit 56 using merge mode, mode select unit 40 may select an encoding mode with which encoding unit 56 may encode a block (e.g., a PU) positioned within the PMER of the video frame.

Mode select unit 40 may select the encoding mode based on various criteria. In one example, mode select unit 40 may select an encoding mode from a set of encoding modes that includes merge mode, by detecting which encoding mode offers the lowest RD cost. In another example, mode select unit 40 may iterate through a list of estimated RD costs, and select an encoding mode associated with the first detected RD cost that is less than a predetermined threshold RD cost. In another example, mode select unit 40 may select merge mode if the estimated RD cost associated with merge mode is less than a predetermined threshold RD cost. While specific examples are described above, it will be appreciated that mode select unit 40 may implement various other RD cost-based mode selection techniques to select an encoding mode with which entropy encoding unit 56 encodes a video frame, in accordance with one or more aspects of this disclosure.

In one example, mode select unit 40 may determine an estimated RD cost associated with signaling an index of a selected MV candidate in a tentative merge list for a block positioned in the PMER. More specifically, the tentative merge list may include spatial motion vector (MV) candidates for the block that are associated with blocks of the video frame that are positioned outside of the PMER, and a temporal motion vector prediction (TMVP) candidate associated with a block of a different video frame. In scenarios where all of the spatial MV candidates for the block are positioned within the PMER, the tentative merge list may include the TMVP and one or more artificial MV candidates that are synthesized to complete the tentative merge list.

Additionally, the MV candidates, such as any available spatial MV candidates and the TMVP, may be positioned in the tentative merge list according to an estimated index value. In examples, the estimated index value may represent an index value that does not take into account possible pruning of MV candidates, as motion information for certain spatial neighbor MV candidates to be pruned may not be available at the time that the tentative merge list is generated, as some or all of the spatial neighbor MV candidates may reside within the PMER. For instance, if the available index values for a merge list are index values 0-4, the TMVP may have an index of 4 in the tentative merge list. However, in the true merge list, the TMVP may have a reduced index value, e.g., due to pruning of one or more MV candidates having index values 0-3. In this manner, an index of an MV candidate in the tentative merge list may, in examples, represent a ceiling, i.e., maximum value, for possible index values of the MV candidate in the corresponding true merge list.

In an instance where mode select unit 40 selects merge mode for encoding a block positioned within the PMER, entropy encoding unit 56 may generate a true merge list for the block, and signal the actual index in the true merge list for the selected MV candidate with which to perform motion prediction for the block. Additionally, entropy encoding unit 56 may signal varying data associated with the selected MV, in various scenarios. In an encoder-only scenario, entropy encoding unit 56 may adjust the tentative merge list (e.g., via pruning of MV candidates) to generate the true merge list for the block. In this scenario, entropy encoding unit 56 may signal the actual index of the selected MV candidate such that a corresponding decoder, such as video decoder 30, may reconstruct the true merge list for the block, and decode the block according to merge mode using the actual index of the selected MV. A potential advantage of the encoder-only technique described above is that entropy encoding unit 56 may signal the actual index as part of an encoded bitstream that complies with requirements specified in an applicable standard, such as the current HEVC standard under development. As a result, the decoder architecture and configuration proposed in the current HEVC standard is sufficient to decode the block.

In some examples where mode select unit 40 selects merge mode for encoding of the block positioned in the PMER, entropy encoding unit 56 may implement encoder-side portions of one or more encoder-decoder techniques described herein. For instance, entropy encoding unit 56 may signal one or more syntax elements that indicate the boundaries of the PMER, as well as one or more syntax elements that indicate coding of blocks of the picture using merge mode motion prediction. In this example, entropy encoding unit 56 does not have to wait for the completion of motion estimation and mode determination for the entire PMER before obtaining the true merge list for a block positioned inside the PMER. Instead, in this example, entropy encoding unit 56 may signal the syntax elements indicating the area of the PMER, and the actual merge index for merge mode coding of particular blocks.

Using the signaled syntax elements, another device, such as video decoder 30, may identify a block positioned within the PMER as having been coded in accordance with merge mode motion prediction, and decode the block in accordance with decoder-side portions of the encoder-decoder techniques described herein. A potential advantage of this encoder-decoder implementation is that entropy encoding unit 56 may encode the block of the PMER expediently, without encoding delays caused by adjusting the tentative merge list.

In another example of the encoder-decoder techniques of this disclosure, entropy encoding unit 56 may signal an indication that a block positioned within the PMER such that the block does not have any spatial MV candidates associated with spatial neighbor blocks positioned outside the PMER was encoded using merge mode. In other words, entropy encoding unit 56 may signal an indication from which a corresponding decoder may determine that the block is positioned within the PMER, that no boundary of the block has any overlap with the perimeter of the PMER, and that the block was encoded using merge mode. By signaling the described indication with respect to the encoded block, entropy encoding unit 56 may conserve time and/or computing resources that video encoder 20 may otherwise expend in generating a merge mode candidate list for the block. Additionally, in this implementation, entropy encoding unit 56 may enable another device, such as video decoder 30, to select a TMVP with which to code the block, without expending time or computing resources to generate a merge mode candidate list for the block.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

As described above, video encoder 20 represents an example of a video coder configured to determine that a slice of a picture of video data begins in a row of coding tree units (CTUs) in the picture at a position other than a beginning of the row, based on the determination, determine that the slice ends within the row of CTUs, and code the slice based on the determination that the slice ends within the row of CTUs. In examples, video encoder 20 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video encoder 20.

Figure 3:
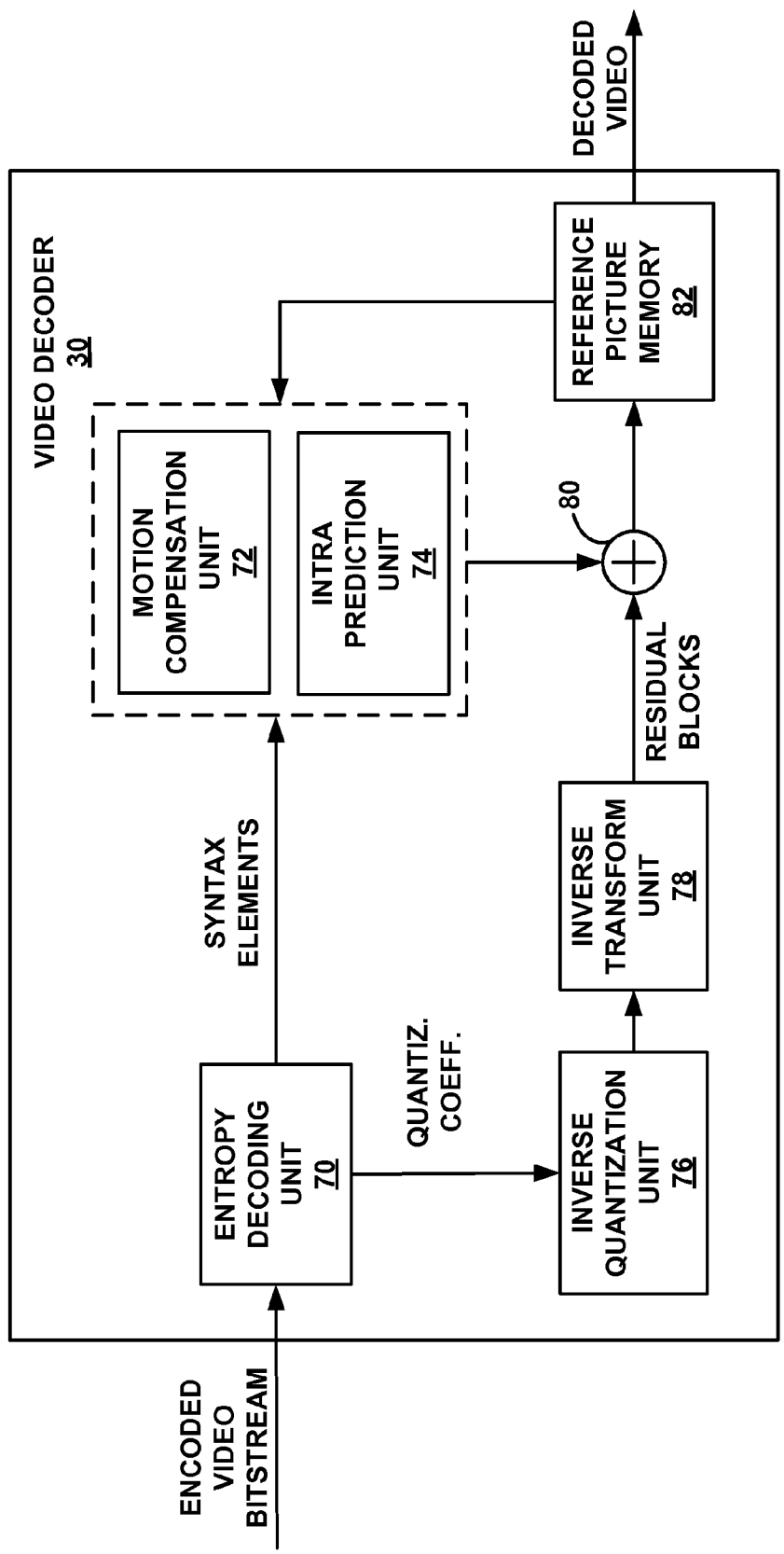
FIG. 3 is a block diagram illustrating an example of a video decoder that may implement techniques for decoding video data that has been encoded using parallel motion estimation.

FIG. 3 is a block diagram illustrating an example of video decoder 30 that may implement techniques for decoding video data that has been encoded using parallel motion estimation. In the example of FIG. 3, video decoder 30 includes an entropy decoding unit 70, motion compensation unit 72, intra prediction unit 74, inverse quantization unit 76, inverse transformation unit 78, summer 80, and reference picture memory 82. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

In scenarios where an encoded block of the encoded video bitstream was encoded using merge mode motion prediction, motion compensation unit 72 may reconstruct a list of MV candidates for the block. Additionally, motion compensation unit 72 may use an index signaled in the encoded video bitstream to select a particular MV candidate of the reconstructed list, and use motion information of the selected MV candidate to decode the block. In this manner, motion compensation unit 72 may implement decoder-side portions of merge mode motion prediction to decode a block of the encoded video bitstream.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In instances where video encoder 20 implements the encoder-only techniques described herein, motion compensation unit 72 may use traditional merge mode-based decoding techniques to decode blocks of the encoded video bitstream that were encoded in merge mode. For example, motion compensation unit 72 may reconstruct the true merge list, and detect, in the encoded video bitstream, an index that indicates the position of an MV candidate selected by video encoder 20 using which the block was encoded. Motion compensation unit 72 may use the signaled index to identify the MV candidate selected by video encoder 20, and use motion information of the selected MV candidate to decode the block. In these examples, video decoder 30 may not be configured to detect that video encoder 20 implemented the encoder-only techniques of this disclosure to generate the true merge list and actual index of the selected MV candidate by adjusting a tentative merge list. In other words, video decoder 30, and its various components, such as motion compensation unit 72, may not require any configuration changes to decode a block using merge mode (even if the block is positioned in a PMER and encoded using PME), in the encoder-only implementations described herein.

Entropy decoding unit 70 may implement one or more decoder-side portions of the encoder-decoder techniques of this disclosure to decode a coding unit (CU) positioned within a parallel motion estimation region (PMER) that was encoded using parallel motion estimation (PME) in accordance with merge mode motion prediction. In examples, the encoded video bitstream received by entropy decoding unit 70 may include one or more syntax elements that indicate that a CU positioned in the PMER of a video frame was encoded using merge mode. More specifically, the encoded bitstream may include one or more syntax elements that indicate the boundaries of the PMER, enabling entropy decoding unit 70 to determine which blocks (e.g., CUs) are positioned within the PMER. Additionally, the encoded video bitstream may include syntax elements that indicate coding of particular CUs in accordance with merge mode motion prediction.

In one example decoder-side implementation of the encoder-decoder techniques described herein, motion compensation unit 72 may construct a modified merge list associated with the block. In some examples, the construction of the modified merge list may include those spatial MV candidates that are available (e.g., MV candidates associated with spatial neighbor candidate blocks positioned outside the PMER), and a TMVP candidate. Motion compensation unit 72 may populate portions of the modified merge list that are vacant due to unavailable spatial MV candidates with artificial MV candidates and/or zero MV candidates. For instance, motion compensation unit 72 may begin by using artificial MV candidates to populate the modified merge list, and use zero MV candidates once motion compensation unit 72 does not have any more artificial MV candidates available.

Additionally, the modified merge list may include an MV selected by video encoder 20, positioned within the modified merge list according to a particular index value. Motion compensation unit 72 may use motion information provided by the selected MV candidate to entropy decode the block. A potential advantage of this implementation is that motion compensation unit 72 may enable video encoder 20 to encode the block using PME in merge mode expediently, and signal indications that the block is positioned within the PMER and coded using merge mode motion prediction without encoding delays.

In another example of the decoder-side portions of the encoder-decoder techniques described herein, motion compensation unit 72 may, in response to certain indications received with respect to the encoded block, select the TMVP for decoding the block using merge mode motion prediction. In other words, in this implementation, motion compensation unit 72 may avoid constructing a merge list for the encoded block. More specifically, if motion compensation unit 72 detects a particular set of conditions with respect to the encoded block, motion compensation unit 72 may use the TMVP candidate in entropy decoding the encoded block. An example set of conditions that motion compensation unit 72 may detect from the received indication includes that the block is positioned within a PMER such that no boundary of the block overlaps at all with the perimeter of the PMER, and that the encoding was done in merge mode. A potential advantage of this implementation is simplicity, in that motion compensation unit 72 may conserve time and computing resources that motion compensation unit 72 would otherwise expend in reconstructing a merge list and decoding the encoded block using an MV candidate selected from the merge list.

Inverse quantization unit 76 inverse quantizes, i.e., dequantizes, the quantized transform coefficients provided in the bitstream and decoded by entropy decoding unit 80. The inverse quantization process may include use of a quantization parameter $QP_y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video coder configured to determine that a slice of a picture of video data begins in a row of coding tree units (CTUs) in the picture at a position other than a beginning of the row, based on the determination, determine that the slice ends within the row of CTUs, and code the slice based on the determination that the slice ends within the row of CTUs. In examples, video decoder 30 may be included in a device for coding video data, such as a desktop computer, notebook (i.e., laptop) computer, tablet computer, set-top box, telephone handset such as a so-called "smart" phone, so-called "smart" pad, television, camera, display device, digital media player, video gaming console, video streaming device, or the like. In examples, such a device for coding video data may include one or more of an integrated circuit, a microprocessor, and a communication device that includes video decoder 30.

FIGS. 4A and 4B are conceptual diagrams illustrating merge mode candidate list construction. More specifically, FIG. 4A illustrates a particular type of block, namely a prediction unit (PU), and motion vector (MV) candidates that a video coder may select in coding the PU in accordance with merge mode. FIG. 4B illustrates the structure of an example merge mode candidate list for a PU. For purposes of clarity, FIGS. 4A and 4B are described herein with reference to various devices and components illustrated in FIGS. 1-3.

FIG. 4A illustrates PU 100. As described, PU 100 may represent a portion of an image, such as a video frame. When coding PU 100 using merge mode motion prediction, a video coder such as video encoder 20 or video decoder 30 may replicate motion vectors from other blocks, such as PUs that neighbor PU 100 in the same video frame, or another PU included in a different video frame. In the example of FIG. 4A, MV candidates 102-108 represent "spatial candidates." In other words, MV candidates 102-108 are associated with CUs that neighbor PU 100 within the same video frame. On the other hand, temporal motion vector prediction (TMVP) candidate 110 represents a motion vector associated with a PU from a different video frame. For instance, video encoder 20 may begin the merge mode encoding process by selecting the four spatial MV candidates 102-108 and TMVP candidate 110 for CU 100.

FIG. 4B illustrates merge mode candidate list 112. Merge mode candidate list 112 includes five MV candidates, positioned according to index values 0-4. In the specific example of FIG. 4B, merge mode candidate list 112 includes three spatial MV candidates 102-106 (positioned according to index values 0-2), TMVP 110 (positioned according to index value 3), and one artificial MV candidate 114 (positioned according to index value 4).

As shown, merge mode candidate list 112 includes three of the four spatial MV candidates 102-108 for CU 100 illustrated in FIG. 4A. For example, when encoding CU 100 in merge mode, video encoder 20 may prune candidates based on redundancy. In the example of FIG. 4B, spatial MV candidate 108 may be pruned. In turn, video encoder 20 may move TMVP candidate 110 to a position indicated by index value 3, and synthesize artificial MV candidate 114 to occupy the position indicated by index value 4.

Figure 4C:
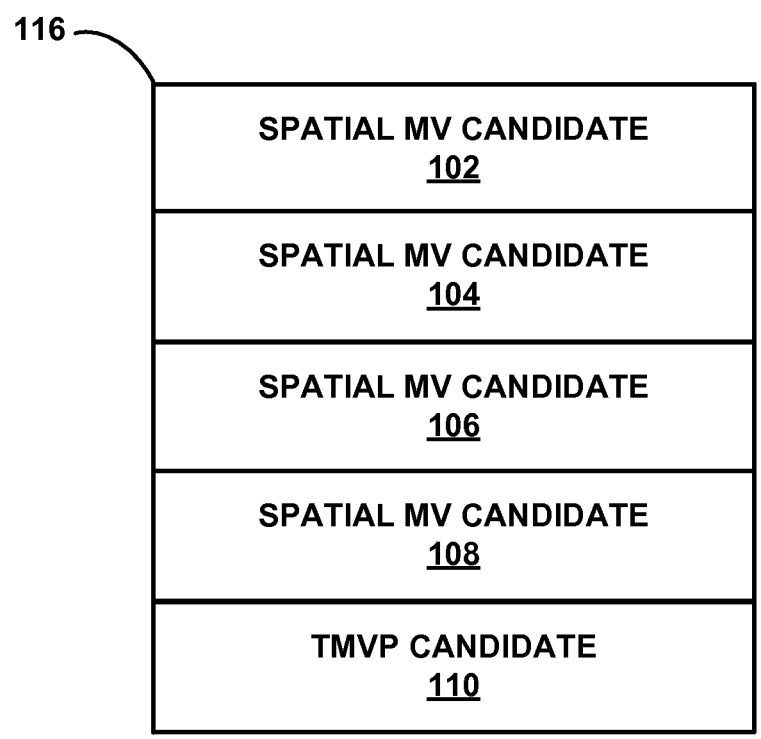

FIG. 4C illustrates an example tentative merge mode candidate list 116. Tentative merge mode candidate list may not exclude any pruned MV candidates. As shown, tentative merge mode candidate list 116 includes all four spatial MV candidates 102-108 associated with spatial neighbor candidate blocks of PU 100. More specifically, spatial MV candidates 102-108 are positioned according to index values 0-3 in tentative merge mode candidate list. Tentative merge mode candidate list 116 also includes TMVP candidate 110, positioned according to index value 4. As no MV candidates have been pruned at the time that tentative merge mode candidate list 116 was constructed, tentative merge mode candidate list 116 does not include any synthesized artificial MV candidates.

Figure 5:
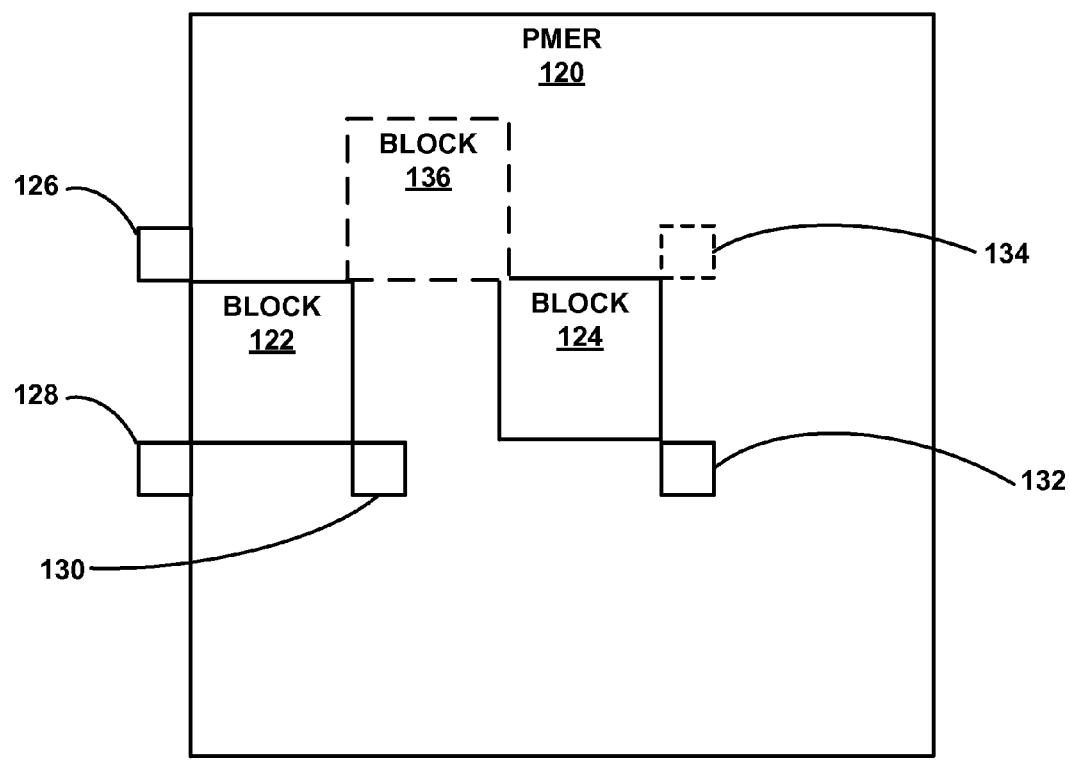
FIG. 5 is a conceptual diagram illustrating an example parallel motion estimation region (PMER), which a video encoder may encode in accordance with parallel motion estimation while using merge motion prediction.

FIG. 5 is a conceptual diagram illustrating example parallel motion estimation region (PMER) 120, which video encoder 20 may encode in accordance with parallel motion estimation while using merge motion prediction. PMER 120 may include several blocks, of which two example blocks 122 and 124 are illustrated in FIG. 5. In example, blocks 122 and 124 may illustrate prediction units (PUs) of a picture or video frame. A video encoder, such as video encoder 20, may encode each block of PMER, such as blocks 122 and 124, in parallel. Additionally, when coding each of blocks 122 and 124 in merge mode, a video coder may replicate motion vectors (MVs) for blocks 122 and 124 using one or both of spatial and temporal candidate blocks. As shown, PMER 120 also includes block 136, which may be a spatial neighbor of both blocks 122 and 124. More specifically, block 136 may be an above-right spatial neighbor block to block 122, and an above-left neighbor block to block 124.

Video encoder 20 may identify spatial MV candidates 126 and 128 for block 122. As shown, spatial MV candidates 126 and 128 are associated with spatial candidate blocks that are positioned outside of PMER 120. More specifically, the boundaries of block 122 overlap with the perimeter of PMER 120, thereby providing block 122 with spatial neighbor blocks positioned outside of PMER 120 but within the same picture. As a result, spatial MV candidates 126 and 128 may be available to video encoder 20 before video encoder 20 starts encoding of PMER 120. Additionally, video encoder 20 may identify temporal motion vector prediction (TMVP) candidate 130 for block 122.

In contrast, video encoder 20 may not identify any spatial MV candidates for block 124 that are associated with blocks positioned outside of PMER 120. More specifically, no boundary of block 124 has any overlap with the perimeter of PMER 120. As one example, video encoder 20 may identify spatial MV candidate 134, which is associated with a block positioned within PMER 120. Spatial MV candidate 134 is illustrated with dashed-line borders, to indicate that spatial MV candidate 134 may not be available to video encoder 20 prior to video encoder 20 beginning encoding of block 124. Additionally, video encoder 20 may identify TMVP candidate 132 for block 124. It will be appreciated that additional spatial MV candidates for one or both of blocks 122 and 124 may be unavailable due to the corresponding blocks being positioned within PMER 120. More specifically, when encoding one or more blocks of PMER 120 using merge mode motion prediction, video encoder 20 may encounter inter-block dependency within PMER 120, e.g., merge candidate list construction may be dependent on motion information of a neighboring block within PMER 120. For instance, a spatial MV candidate associated with block 136 may be unavailable to one or both of blocks 122 and 124. For purposes of clarity, only unavailable spatial candidate 134 is illustrated in FIG. 5.

As described, video encoder 20 may implement techniques of this disclosure to generate a tentative merge mode candidate list for each of blocks 122 and 124. More specifically, video encoder may reduce or restrict the usage of dependent information in the motion estimation (ME) process. For instance, video encoder 20 may generate a tentative merge list for block 122 that includes spatial MV candidates 126 and 128 and TMVP 130. The tentative merge list may, in some examples, include redundant motion information, as video encoder may not yet have access to information necessary to prune one or more MV candidates of the tentative merge mode candidate list. Similarly, for block 124, video encoder 20 may generate a tentative merge mode candidate list that includes TMVP 132 and multiple spatial MV candidates, with possible redundancy as video encoder 20 has not yet pruned the tentative merge mode candidate list. Video encoder 20 may assign different estimated index values to the MV candidates in the respective tentative merge mode candidate lists, such as ceiling index values described above.

Figure 6A:
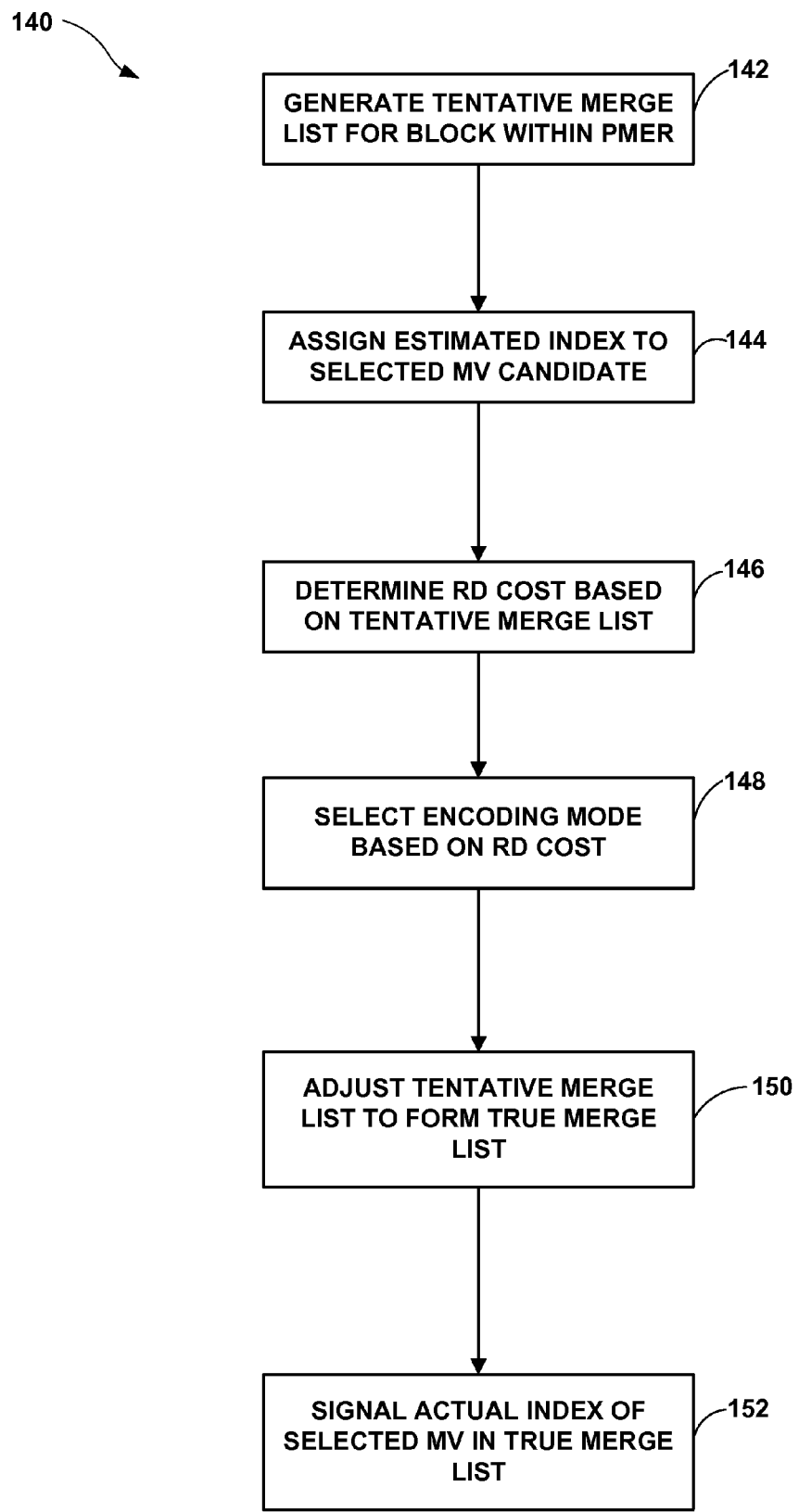
FIGS. 6A and 6B are flowcharts illustrating example processes that video coders may perform, in accordance with one or more aspects of this disclosure.
Figure 6B:
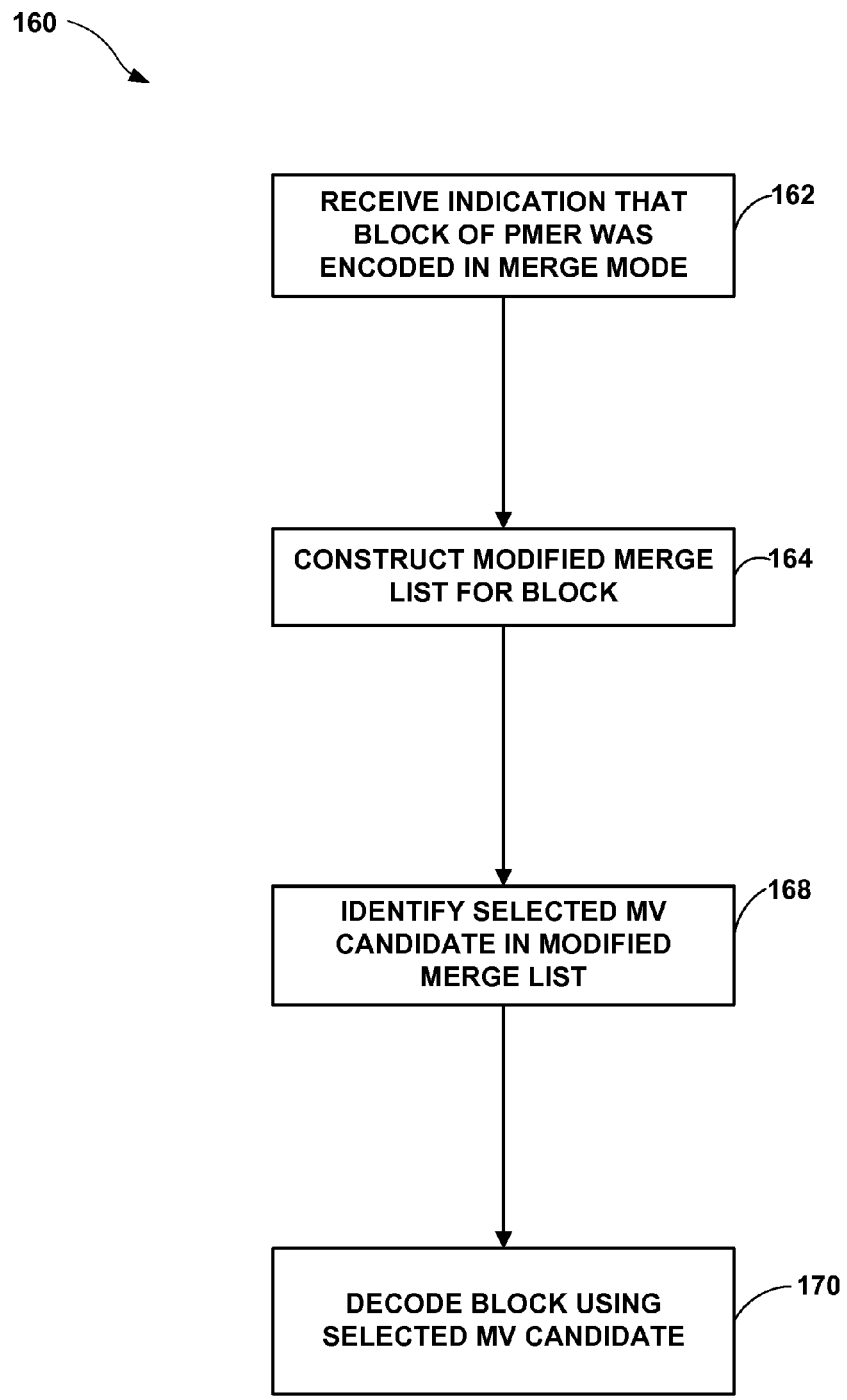

FIGS. 6A and 6B are flowcharts illustrating example processes that video coders may perform, in accordance with one or more aspects of this disclosure. FIG. 6A illustrates an example process 140 that a video encoder may perform, in accordance with one or more techniques of this disclosure. Process 140 may represent an encoder-only implementation of the techniques described above. Process 140 may begin when an encoder, such as video encoder 20, generates a tentative merge mode candidate list for a block that is positioned within a parallel motion estimation region (PMER) of a video frame (142). In some examples, video encoder 20 may generate the tentative merge mode candidate list without eliminating redundancy through pruning one or more MV candidates. More specifically, video encoder 20 may not have access to certain motion information of spatial candidate blocks positioned within the PMER, in order to determine redundancy for the purposes of pruning. As described, video encoder 20 may encode all blocks of the PMER in parallel, using parallel motion estimation (PME).

Video encoder 20 may assign an estimated index to a selected motion vector (MV) candidate of the tentative merge list (144). More specifically, video encoder 20 may select a particular MV candidate from the tentative merge list, with which to encode the block in accordance with merge mode. The particular MV candidate may be selected based on an RD cost of the candidate versus other merge mode candidates and/or versus other coding modes. Additionally, the selected MV candidate may be one of the available candidates, i.e., an MV associated with a spatial candidate block of the current frame positioned outside the PMER, or the TMV associated with a block of a different frame. Additionally, video encoder 20 may assign the estimated index based on an estimated position of the selected MV in the tentative merge list. For instance, video encoder 20 may assign an estimated index that represents a ceiling value of a actual index of the selected MV candidate in a true merge list.

Additionally, video encoder 20 may determine a rate distortion (RD) cost associated with encoding and signaling the block using the selected candidate in merge mode, based on data associated with the tentative merge list (146). For instance, the true RD cost associated with encoding the block may be different from the RD cost calculated based on the tentative merge list. More specifically, differences between the tentative merge list and a corresponding true merge list may cause different RD costs based on the merge list used for encoding the block positioned within the PMER. As one example, a difference between the estimated index value of the selected MV and the actual index value of the selected MV may cause a difference between the respective RD costs.

Based on the RD cost determined with respect to the tentative merge list (e.g., having the selected MV candidate positioned according to the estimated index), video encoder 20 may select an encoding mode with which to code the block positioned within the PMER (148). For instance, video encoder 20 may select merge mode from a list of encoding modes available to video encoder 20, and select one of the available candidates in the tentative merge list. In one example, video encoder 20 may select merge mode and one of the selected MV candidates based on the determined RD cost associated with coding the block using the selected MV candidate being lower than the RD costs associated with the other available modes. Video encoder 20 may select and evaluate the RD cost of only those MV candidates that are currently available, i.e., spatial MV candidates associated with spatial candidate blocks outside the PMER, or the TMV.

Once PME is completed, and motion information is available for MV candidates in the PMER. Video encoder 20 may adjust the tentative merge list to form a true merge list for the block positioned within the PMER (150). For instance, video encoder 20 may remove certain MV candidates from the tentative merge list via "pruning" in accordance with merge mode motion prediction. Whereas the position of the selected MV candidate in the tentative merge list is indicated by a first, estimated index value, after pruning to construct the true merge list, the selected MV candidate may be positioned according to an actual index value within the true merge list. In some examples, the actual index value in the actual merge list may differ from the estimated index value in the tentative merge list. As one example, the actual index value may be less than the estimated index value, in a scenario in which the estimated value represents a ceiling (largest possible value) for possible actual index values of the selected MV, and the index of the selected MV candidate in the true list is lower than in the tentative merge list due to pruning. Additionally, video encoder 20 may signal the actual index of the selected MV (152). Video encoder 20 may signal the actual index value such that video decoder 30 is able to reconstruct the true merge list, and identify the selected MV according to the actual index, in order to decode the block.

FIG. 6B illustrates example process 160 that a video decoder may perform, in accordance with one or more techniques of this disclosure. Process 160 may represent a decoder-side portion of one or more encoder-decoder implementations of the techniques described above. Process 160 may begin when video decoder 30 receives, as part of an encoded bitstream, an indication that a block positioned within a PMER of a video frame was encoded using merge mode motion prediction (162). Video decoder 30 may receive the indication in the form of a combination of syntax elements included in the encoded bitstream. For instance, video decoder 30 may receive one or more syntax elements that specify the bounds of the PMER. Additionally, video decoder 30 may receive one or more syntax elements that indicate that a particular block was encoded using merge mode. Using the combination of syntax elements described, video decoder 30 may determine that a block positioned within the PMER was encoded in merge mode, in accordance with PME.

Video decoder 30 may construct a modified merge list for the block (164). In various examples, the modified merge list may resemble a tentative merge list that video encoder 20 may generate for the same block, and the modified merge list may exclude those spatial merge mode MV candidates that are not available for a current block being considered during motion estimation process, due to PME. For instance, video decoder 30 may construct the modified merge list using spatial MV candidates and a TMVP candidate, where the merge list is not pruned because motion information was not available for some spatial MV candidates in the PMER at the time of encoding the particular block during PME.

Additionally, video decoder 30 may identify a selected MV candidate using in the modified merge list (168). The selected MV candidate may correspond with an MV candidate that video encoder 20 utilized to encode the block in merge mode. More specifically, video decoder 30 may use an index value to identify the selected MV candidate in the modified merge list. Using the MV candidate selected from the modified merge list, video decoder 30 may determine motion information with which video encoder 20 encoded the block. Video decoder 30 may decode the block using the motion information represented by the selected MV candidate (170). For example, motion compensation unit 72 of video decoder 30 may use the motion vector, prediction direction and reference picture index specified for the selected MV candidate to inter-decode the current block. In particular, motion compensation unit 72 selects the block identified by the MV candidate in the reference picture identified by the reference picture index value in the reference picture list indicated by the prediction direction.

Techniques of this disclosure may be applied to any partition configuration, any size and any number of partitions and blocks. Block and partition may also be referred to as a prediction unit (PU), coding unit (CU), largest coding unit (LCU), coding tree unit (CTU), and/or groups of blocks and partitions. The techniques may also be applied to a coding unit (CU) or blocks of other types or at different levels. Additionally, the techniques be applied for LCU, CU, PU, TU, groups of one or more of LCUs, CUs, PUs, TUs or other sub block levels. The techniques may also be applied to advanced motion vector prediction (AMVP) as a motion vector prediction mode, like merge mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
  receiving an indication of merge mode encoding of an encoded block of the encoded video data;
  detecting a set of conditions with respect to the merge mode-encoded block, at least in part by:
    determining that the merge mode-encoded block is positioned within a parallel motion estimation region (PMER) that includes a plurality of encoded blocks of the encoded video data; and
    determining that all spatial neighboring blocks of the merge mode-encoded block are included in the plurality of encoded blocks positioned within the PMER, such that no motion information for the spatial neighboring blocks is available during decoding of the merge mode-encoded block;
  responsive to receiving the indication of the merge mode encoding of the merge mode-encoded block and responsive to detecting the set of conditions with respect to the merge mode-encoded block, identifying, a temporal motion vector prediction (TMVP) candidate associated with the merge mode-encoded block without constructing a merge mode candidate list for merge mode decoding of the merge mode-encoded block, the TMVP candidate being available for identifying;
  merge mode decoding the merge mode-encoded block using the identified TMVP candidate based on the indication of merge mode encoding of the merge mode-encoded block and based on the set of conditions being detected with respect to the merge mode-encoded block; and
  decoding two or more encoded blocks of the plurality of encoded blocks included in the PMER in parallel.

2. The method of claim 1, wherein identifying the TMVP candidate comprises identifying the TMVP candidate without using a signaled index value associated with the TMVP candidate.

3. A device for decoding encoded video data, the device comprising:
  a memory storing at least a portion of the encoded video data; and
  a video decoder comprising two or more processing units in communication with the memory, the video decoder being configured to:
    receive an indication of merge mode encoding of an encoded block of the encoded video data;
    detect a set of conditions with respect to the merge mode-encoded block, wherein to detect the set of conditions, the video decoder is configured to:
      determine that the merge mode-encoded block is positioned within a parallel motion estimation region (PMER) that includes a plurality of encoded blocks of the encoded video data; and
      determine that all spatial neighboring blocks of the merge mode-encoded block are included in the plurality of encoded blocks positioned within the PMER, such that no motion information for the spatial neighboring blocks is available during decoding of the merge mode-encoded block;
    responsive to the receipt of the indication of the merge mode encoding of the merge mode-encoded block and responsive to the detection of the set of conditions with respect to the merge mode-encoded block, identify a temporal motion vector prediction (TMVP) candidate associated with the merge mode-encoded block without construction of a merge mode candidate list for merge mode decoding of the merge mode-encoded block, the TMVP candidate being available for identifying;
    merge mode decode the merge mode-encoded block using the identified TMVP candidate based on the indication of merge mode encoding of the merge mode-encoded block and based on the set of conditions being detected with respect to the merge mode-encoded block; and
    decode two or more encoded blocks of the plurality of encoded blocks included in the PMER in parallel.

4. The device of claim 3, wherein the video decoder is configured to identify the TMVP candidate without using an index value associated with the TMVP candidate.

5. A device for decoding encoded video data, the device comprising:
  means for receiving an indication of merge mode encoding of an encoded block of the encoded video data;
  means for detecting a set of conditions with respect to the merge mode-encoded block, the means comprising:
    means for determining that the merge mode-encoded block is positioned within a parallel motion estimation region (PMER) that includes a plurality of encoded blocks of the encoded video data; and
    means for determining that all spatial neighboring blocks of the merge mode-encoded block are included in the plurality of encoded blocks positioned within the PMER, such that no motion information for the spatial neighboring blocks is available during decoding of the merge mode-encoded block;
  means for identifying, responsive to receiving the indication of the merge mode encoding of the merge mode-encoded block and responsive the set of conditions being detected with respect to the merge mode-encoded block, a temporal motion vector prediction (TMVP) candidate associated with the merge mode-encoded block without constructing of a merge mode candidate list for merge mode decoding of the merge mode-encoded block, the TMVP candidate being available for identifying;
  means for merge mode decoding the merge mode-encoded block using the identified TMVP candidate based on the indication of merge mode encoding of the block and based on the set of conditions being detected with respect to the merge mode-encoded block; and
  means for decoding two or more encoded blocks of the plurality of encoded blocks included in the PMER in parallel.

6. A non-transitory computer-readable storage medium having stored thereon instructions that, when executed, cause a programmable processor of a computing device to:

receive an indication of merge mode encoding of an encoded block of encoded video data;

detect a set of conditions with respect to the merge mode-encoded block, at least in part by:

determine that the merge mode-encoded block is positioned within a parallel motion estimation region (PMER) that includes a plurality of encoded blocks of the encoded video data; and determine that all spatial neighboring blocks of the merge mode-encoded block are included in the plurality of encoded blocks positioned within the PMER, such that no motion information for the spatial neighboring blocks is available during decoding of the merge mode-encoded block;

responsive to the receipt of the indication of the merge mode encoding of the merge mode-encoded block, identify a temporal motion vector prediction (TMVP) candidate associated with the merge mode-encoded without construction of a merge mode candidate list for merge mode decoding of the merge mode-encoded block, the TMVP candidate being available for identifying;

merge mode decode the merge mode-encoded block using the identified TMVP candidate based on the indication of merge mode encoding of the merge mode-encoded block and based on the set of conditions being detected with respect to the merge mode-encoded block; and decode two or more encoded blocks of the plurality of encoded blocks included in the PMER in parallel.

7. The method of claim 1, the method being executable on a wireless communication device, wherein the wireless communication device comprises:

a memory configured to store at least a portion of the encoded video data;

two or more processing units coupled to the memory, and being configured to:

execute instructions to process the video data stored in the memory; and perform the parallel decoding of the two or more encoded blocks included in the PMER; and a receiver coupled to the two or more processing units, and being configured to receive the indication of merge mode coding of the merge mode-encoded block.

8. The method of claim 7, wherein wireless communication device is a cellular telephone and the indication of the merge mode coding of the merge mode-encoded block received by the receiver is modulated according to a cellular communication standard.

9. The device of claim 3, wherein the device is a wireless communication device that further comprises a receiver configured to receive the indication of the merge mode encoding of the merge mode-encoded block.

10. The device of claim 9, wherein the wireless communication device is a cellular telephone and the indication of the merge mode encoding received by the receiver is modulated according to a cellular communication standard.

* * * * *